Dec. 20, 1966  K. FOSTER ETAL  3,292,370
POWER TRANSMISSION APPARATUS
Filed Sept. 3, 1965

United States Patent Office 3,292,370
Patented Dec. 20, 1966

3,292,370
POWER TRANSMISSION APPARATUS
Keith Foster and Graham Alexander Parker, Birmingham, England, assignors to National Research Development Corporation, London, England, a British corporation
Filed Sept. 3, 1965, Ser. No. 484,851
Claims priority, application Great Britain, May 14, 1965, 20,561/65
8 Claims. (Cl. 60—54.5)

This invention concerns power transmission apparatus and is a continuation-in-part of our application Serial No. 357,836, filed April 6, 1964.

It is an object of the invention to provide power transmission apparatus for operation by fluid pressure oscillations which may be easily and precisely controlled.

According to the present invention, there is provided power transmission apparatus comprising a pressure responsive device having two opposed faces, means for subjecting one face of the pressure responsive device to fluid pressure oscillations so as to cause the pressure responsive device to oscillate, a driving member which is adapted to drive a load and which is itself drvingly connected to the pressure responsive device, and pressure balance means for balancing the pressures on the opposed faces of the pressure responsive device so as to maintain said driving member stationary in a selected position when so required.

Preferably the pressure balance means comprises a conduit through which the said fluid pressure oscillations may be applied to the other face of the pressure responsive member. The said conduit may be provided with valve means which may be opened and closed respectively to permit and prevent the transmission of fluid pressure through said conduit.

Means may be provided for moving said valve means into a closed position in which the transmission of pressure through said conduit is prevented, an open position in which said fluid pressure oscillations are transmitted through said conduit to said other face of the pressure responsive device, and at least one intermediate position in which a predetermined restriction to fluid flow in said conduit is presented.

Preferably the pressure responsive device comprises at least one piston.

Other objects and advantages of the invention will be apparent from the following description, given by way of example only, with reference to the accompanying drawings, in which.

Figure 1:
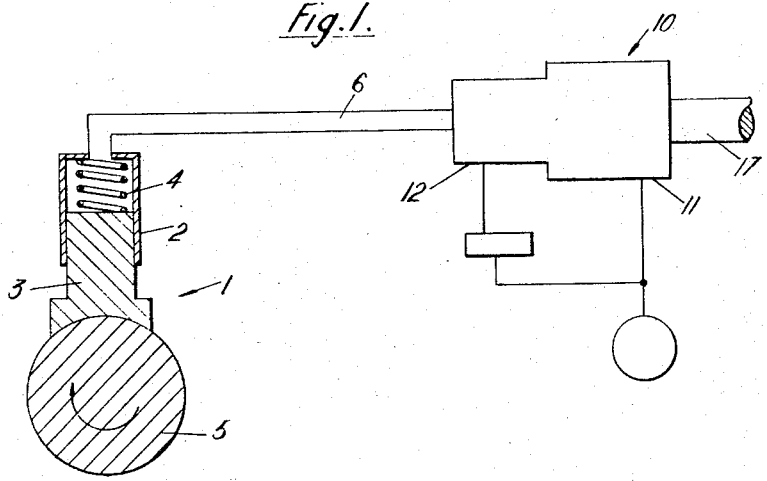
FIG. 1 is a schematic diagram, partly in section, showing a pulsator and the power transmission apparatus, parts of the transmission apparatus being omitted for purposes of clarity.

In FIGURE 1 there is shown a pulsator 1 comprising a chamber 2 within which is mounted a piston 3. The piston 3 is urged by a spring 4 into contact with an eccentric 5. The chamber 2 is filled with a pressure-transmitting fluid and, as the eccentric 5 is rotated, a pulsating fluid pressure will be built up in a supply conduit 6. Any convenient source of fluid pressure oscillations may, of course, be employed. The pressure transmitting fluid may be liquid, such as oil or a silicone pressure fluid or gaseous, such as oil or compressed air. The mean pressure of the pressure transmitting fluid is typically between 1,000 and 2,000 p.s.i.a.

Figure 2:
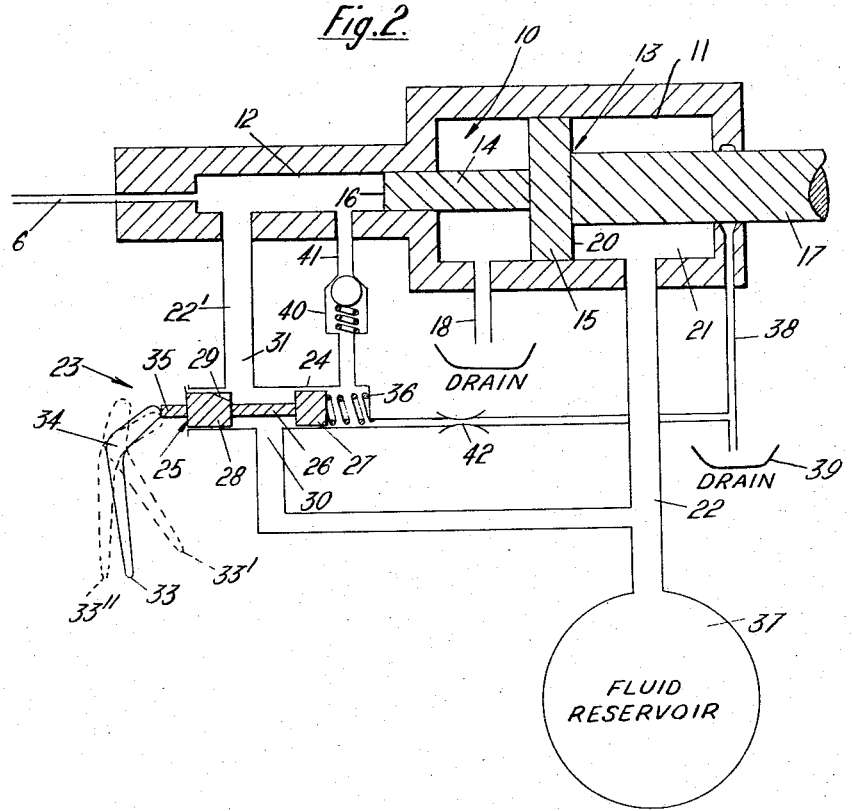
FIG. 2 is a partially sectioned schematic diagram of the power transmission apparatus in more detail.

The supply conduit 6 extends to a relatively small diameter portion 12 of a chamber generally designated 10 which is also provided with a relat'vely large diameter portion 11. A piston 13 (FIGURE 2) is mounted for sliding movement in the chamber 10. The piston 13 has two portions 14, 15 which are slidably mounted in the portions 11, 12 respectively.

The said pulsating fluid pressure acts on a face 16 provided in the portion 14 of the piston 13, causing the latter to oscillate. The piston 13 has a piston rod 17 which constitutes (or which is connected to) a driving member for driving a load (not shown), the oscillation of the piston 13 causing the load to be driven. The load may, for example, be a drilling head or hammer.

The portion 15 of the piston 13 has a face 20 which faces in the opposite direction to the face 16 and is of equal effective area. The face 20 forms a movable wall of a chamber 21 which is filled with the said pressure-transmitting fluid. A conduit 22 communicates with the chamber 21 and is connected to the portion 12 of the chamber 10 through an extension 22′, thereby connecting the opposed pressure faces 16, 20 of the piston 13. A drain 18 is provided in the chamber 10 on the side of the piston 13 remote from chamber 21 for the purpose of draining any leakage flow of fluid past the portions 14, 15 of the piston 13.

The conduit 22, with its extension 22′, incorporates a valve 23 which controls fluid flow through the conduit 22 and extension 22′. The valve 23 comprises a hollow valve body 24 within which a spool 25 is slidably mounted. The spool 25 has a stem 26 of reduced diameter bounded by tightly fitting lands 27, 28. One of the lands 28 has one or more notches 29 provided in its curved surface and extending parallel to the axis of the spool 25. Each notch 29 communicates with the annular space bounding the stem 26 and tapers in radial depth from a maximum depth adjacent the stem 26 to zero at approximately the mid-axial point of the land 28. Each notch 29 may be formed, for example, by a simple cut of V-section in the land 28. The presence of the notches 29 gives the land 28 a tapering effective cross-sectional area which varies from a minimum adjacent the stem 26 to a maximum adjacent at approximately the mid-axial point of the land 28.

The wall of the valve body 24 is provided with ports 30, 31 communicating with the portions 11, 12 respectively, of the chamber 10 through respective portions of the conduit 22 and extension 22′, the port 30 be'ng at all times in communication with the annular space bounding the stem 26. The spool 25 is movable in the valve body 24 by means of a manual lever 33 pivoted at 34 and engaging a tappet 35 formed on the spool 25. Movement of the lever 33 causes the spool 25 to move axially in the valve body 24 and thereby controls fluid flow in the conduit 22, 22′. Thus the lever 33 has an open position, 33′ (shown in broken lines) in which the reduced diameter stem 26 of the spool 25 is aligned with the ports 30, 31; in this position the valve 23 presents virtually no restriction to fluid flow in the conduit 22, 22′. The lever 33 also has a closed portion, 33″ (also shown in broken lines) in which the land 28 completely blocks the port 31, preventing fluid flow in the conduit 22, 22′ and several intermediate positions, one of which is illustrated at 33 in solid lines, in which different parts of the notches 29 are aligned with the port 31, presenting variable restrictions to flow in the conduit 22, 22′. A spring 36 urges the tappet 35 into contact with lever 33 and provides a degree of "feel" for the operator of lever 33.

A fluid reservoir 37 communicates with the conduit 22 between the valve 23 and the chamber 21. The function of the reservoir 37 will become apparent from the description of the operation of the apparatus which follows.

In operation, the pulsator 1 applies fluid pressure oscillations to the face 16 of the piston 13. When it is desired to transmit power from these pressure oscillations to the piston rod 17 the lever 33 is put in its closed position 33″, closing the valve 23. The fluid pressure oscillations cause the piston 13 to oscillate in the chamber 10, the fluid in the chamber 21 and the reservoir 37 acting as a fluid spring: that is to say, on movement of the piston 13 to the right in FIGURE 2, fluid is compressed in the chamber 21 and reservoir 37; on completion of such movement, the energy stored in the compressed fluid in the chamber 21 and reservoir 37 is returned to the piston 13, causing the latter to move to the left prior to receiving a further pressure pulse. In this way it will be apparent that power is transmitted to the piston rod 17 (and thence to the tool) with minimum loss of energy, and, therefore, maximum efficiency.

It will be appreciated that the reservoir 35 may be replaced by any convenient fluid spring, such as a movable spring urged piston in a cylinder, while in some circumstances the resilience of the fluid in the conduit 22 may be sufficient to enable the reservoir 35 to be dispensed with.

When it is desired to stop the movement of the piston rod 17 the valve 33 is moved to the open position 33', fluid pressure oscillations are now also applied through the unrestricted conduit 22, 22' to the face 20 of the piston 13. Since the opposed faces 16, 20 have equal effective areas, the piston 13 is therefore pressure-balanced, and the resultant force acting thereon is zero. Consequently the piston 13 will remain stationary, and may be held at rest at any selected position in the chamber 10 when so required. The operator of the apparatus has, therefore, complete control over the apparatus and the tool which it drives by means of the valve 23, without the necessity at any time of interrupting the operation of the pulsator 1.

Fine control of the power transmitted by the apparatus is possible by positioning the valve 33 in any of the intermediate positions as illustrated, to cause different restrictions to flow in the conduit 22, 22'. The intermediate positions also enable any loss of fluid through leakage to be made up from the supply conduit 6 after, for example, prolonged operation of the apparatus.

Leakage flow of fluid past the piston rod is conducted away by a drain 38 incorporated in the end wall of the chamber 10 to a sump or drain shown diagrammatically at 39.

A safety valve 40 is included in a conduit 41 connected to the portion 12 of the chamber 10 to which the fluid pressure oscillations are applied. The conduit 41 is connected to the end of valve body 24 adjacent the land 27, said end of the cylinder also being connected, through a restrictor 42, to the drain 38. The safety valve 40, which may be of any known type, but which is illustrated as a spring-loaded ball valve, is normally held closed, and is opened only when the fluid pressure in portion 12 exceeds a predetermined pressure, for example, 3,000 p.s.i. On opening the valve 40 relieves the pressure in the portion 12 through the restrictor 42: at the same time, the pressure upstream of restrictor 42 causes the valve spool 25 to be urged to the left, that is, towards the fully open position, thereby balancing the pressures on the piston faces 16, 20 and preventing further transmission of power by the apparatus. The drains 18, 38, restrictor 42 and safety valve 40 have been omitted from FIGURE 1 in the interests of clarity.

When the apparatus is used to drive an impact tool such as, for example, a rock drill, it is desirable to provide the face 20 of the piston 13 with somewhat smaller effective area than the face 16; a degree of pressure-balancing in accordance with the principle described above will still, however, obtain. With an arrangement of this kind, of course, the piston 13 comes to rest at the extreme right of the chamber 10 when the valve 33 is moved to its open position. This method of stopping the operation of the drill is to be preferred to the commonly used method which employs a stop valve in the pressure supply conduit 6, since this method has been found to give rise to undesirably high pressures in the conduit 6. By means of the present invention, however, the oscillating fluid pressures in the conduit 6, provided this conduit has a length of nearly half an oscillation wavelength, are relatively low when the valve 33 is open and the piston 13 is stationary.

We claim:
1. Power transmission apparatus comprising means defining a chamber having first and second portions for pressure fluid, a movable pressure responsive device having first and second opposed faces comprising respective movable walls of said first and second portions, supply conduit means for connecting said first portion of the chamber to a source of fluid pressure oscillations to cause oscillation of said pressure responsive device, a load driving member which is drivingly connected to the pressure responsive device, pressure balance conduit means connected between said first and second portions of the chamber for the transmission of fluid pressure oscillations from said first to said second portion, and valve means in said pressure balance conduit means for selectively permitting and restricting transmission of said fluid pressure oscillations through said pressure balance conduit means.

2. Power transmission apparatus as claimed in claim 1 in which the two opposed faces of the pressure responsive device have equal effective areas.

3. Power transmission apparatus as claimed in claim 1 and including a fluid reservoir communicating with said chamber.

4. Power transmission apparatus as claimed in claim 1 including valve operating means for moving said valve means selectively into a closed position in which the transmission of fluid pressure oscillations through the pressure balance conduit means is prevented, into an open position in which said fluid pressure oscillations are transmitted through the pressure balance conduit means, and into at least one intermediate position in which a predetermined restriction to fluid flow in said pressure balance conduit means is presented.

5. Power transmission apparatus as claimed in claim 1 wherein said supply conduit means has a length substantially equal to half the oscillation wavelength.

6. Power transmission apparatus as claimed in claim 1 in which the pressure responsive device comprises at least one piston.

7. Power transmission apparatus as claimed in claim 4 wherein said valve means comprises a hollow body, a valve member slidably mounted therein, respective fluid inlet and outlet ports disposed in the path of said valve member in said body and connected to said pressure balance conduit means, said valve member having different effective cross-sectional areas in different portions thereof whereby movement of said valve member relative to said body causes a variation in the effective restriction to fluid flow between said inlet and outlet ports.

8. Power transmission apparatus as claimed in claim 7 including a safety valve in fluid communication with the said first chamber portion boundaried by the first face of the pressure responsive device and with the said hollow body of the valve means for opening when the fluid pressure on said first face exceeds a predetermined pressure to apply said fluid pressure to said hollow body to move the valve member to the said open position.

No references cited.

MARTIN P. SCHWADRON, *Primary Examiner.*
ROBERT R. BUNEVICH, *Examiner.*